United States Patent
Feng et al.

(10) Patent No.: US 10,462,784 B2
(45) Date of Patent: Oct. 29, 2019

(54) METHOD AND DEVICE FOR INFORMATION SUBMISSION AND RESOURCE ALLOCATION IN INTERNET OF VEHICLES

(71) Applicant: China Academy of Telecommunications Technology, Beijing (CN)

(72) Inventors: Yuan Feng, Beijing (CN); Jiye Tang, Beijing (CN); Haijun Zhou, Beijing (CN); Xuanyu Guo, Beijing (CN); Jiayi Fang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 36 days.

(21) Appl. No.: 15/513,548

(22) PCT Filed: Sep. 1, 2015

(86) PCT No.: PCT/CN2015/088761
§ 371 (c)(1),
(2) Date: Mar. 22, 2017

(87) PCT Pub. No.: WO2016/045485
PCT Pub. Date: Mar. 31, 2016

(65) Prior Publication Data
US 2017/0290009 A1    Oct. 5, 2017

(30) Foreign Application Priority Data
Sep. 22, 2014    (CN) .......................... 2014 1 0487322

(51) Int. Cl.
*H04W 72/04*    (2009.01)
*H04L 5/22*    (2006.01)
(Continued)

(52) U.S. Cl.
CPC .......... *H04W 72/0446* (2013.01); *H04L 5/22* (2013.01); *H04W 72/04* (2013.01);
(Continued)

(58) Field of Classification Search
None
See application file for complete search history.

(56) References Cited

U.S. PATENT DOCUMENTS

2012/0014334 A1    1/2012    Oh et al.
2014/0044095 A1*   2/2014    Li ........................ H04W 16/14
                                                       370/331
(Continued)

FOREIGN PATENT DOCUMENTS

CN    1553715 A    12/2004
CN    101605024 A  12/2009
(Continued)

OTHER PUBLICATIONS

PCT International Search Report (Chinese and English Translations), 5 pgs., (dated Nov. 17, 2015).
(Continued)

*Primary Examiner* — Kevin C. Harper
*Assistant Examiner* — Derrick V Rose
(74) *Attorney, Agent, or Firm* — Womble Bond Dickinson (US) LLP

(57) ABSTRACT

Embodiments of the present application are for use in solving the problem of high probability of collisions occurring among existing node devices. Disclosed are a method and device for information submission and resource allocation in the V2X system. The resource allocation method comprises: a network side device assigns a subframe resource to a node device just accessing a cell and notifies the node device just accessing the cell of the assigned subframe resource; for node devices already accessing the
(Continued)

cell, the network side device determines colliding node devices, reassigns subframe resources to the colliding node devices, and respectively notifies the colliding node devices of the reassigned subframe resources. Because employed is a solution in which resources are scheduled collectively by a network side device for node devices accessing a cell, in addition to ensuring time-division multiplexing of resources among a node device and other node devices having needs for communication in the surrounding, thus increasing system capacity, timely and effective solution of resource collisions among colliding node devices is also allowed, thus increasing the performance of communication among system node devices.

15 Claims, 4 Drawing Sheets

(51) Int. Cl.
*H04W 72/08* (2009.01)
*H04W 84/04* (2009.01)
*H04W 88/08* (2009.01)
*H04W 92/16* (2009.01)

(52) U.S. Cl.
CPC ........ *H04W 72/082* (2013.01); *H04W 84/042* (2013.01); *H04W 88/08* (2013.01); *H04W 92/16* (2013.01)

(56) References Cited

U.S. PATENT DOCUMENTS

| 2015/0126188 A1* | 5/2015 | Lindoff | H04W 8/005 |
| | | | 455/434 |
| 2016/0381663 A1* | 12/2016 | Zhao | H04W 8/005 |
| | | | 370/329 |
| 2017/0208448 A1* | 7/2017 | Zhu | H04W 8/005 |
| 2017/0280471 A1* | 9/2017 | Lee | H04W 72/12 |

FOREIGN PATENT DOCUMENTS

| CN | 101626618 A | 1/2010 |
| CN | 102625252 A | 8/2012 |
| CN | 102668683 A | 9/2012 |
| CN | 102695281 A | 9/2012 |
| CN | 102792745 A | 11/2012 |
| CN | 102792745 A | 11/2012 |
| CN | 102905309 A | 1/2013 |
| CN | 103002578 A | 3/2013 |
| CN | 103220814 A | 7/2013 |
| CN | 103229582 A | 7/2013 |
| CN | 103383811 A | 11/2013 |
| CN | 103501543 A | 1/2014 |
| CN | 103517343 A | 1/2014 |
| CN | 103650371 A | 3/2014 |
| CN | 103906249 A | 7/2014 |
| WO | WO 2010/049801 A1 | 5/2010 |
| WO | WO 2011/069295 A1 | 6/2011 |
| WO | WO 2013/156072 A1 | 10/2013 |
| WO | WO2013156072 A1 | 10/2013 |
| WO | WO 2012/166455 A1 | 11/2013 |
| WO | WO2014024071 A2 | 2/2014 |

OTHER PUBLICATIONS

PCT Written Opinion of the International Searching Authority (Chinese and English Translations), 8 pgs., (dated Apr. 19, 2010).
PCT International Preliminary Report on Patentability (Chapter I of the Patent Cooperation Treaty), 4 pgs., (dated Mar. 26, 2017).
Extended European Search Report for Counter EP patent application No. 15845385.2-1857, 9 pgs. (dated Sep. 20, 2017).
Chinese Office Action in application No. 201410487322.3 dated Mar. 2, 2018.
Chinese Office Action in application No. 201410487322.3 dated Nov. 1, 2018.
Chinese Office Action in application No. 201410487322.3 dated Apr. 29, 2019.
European Office Action in application No. 15845385.2 dated Apr. 8, 2019.

* cited by examiner

METHOD AND DEVICE FOR INFORMATION SUBMISSION AND RESOURCE ALLOCATION IN INTERNET OF VEHICLES

CROSS-REFERENCE TO RELATED APPLICATIONS

This application is a U.S. National State of International Application No. PCT/CN2015/088761, filed on Sep. 1, 2015, designating the United States, and claims the benefit of Chinese Patent Application No. 201410487322.3, filed with the Chinese Patent Office on Sep. 22, 2014 and entitled "A method and apparatus for reporting information and allocating a resource in a V2X system", which was incorporated by reference in its entirety.

FIELD

The present invention relates to the field of communications, and particularly to a method and apparatus for reporting information and allocating a resource in a Vehicle to Everything (V2X) system.

BACKGROUND

As the on-vehicle communication systems are developing, and the mobile ad-hoc network technologies are gradually becoming matured, the Dedicated Short Range Communication (DSRC) technology for a V2X system has been developed in order for real-time, dynamic, and intelligent management on vehicles. Positions, speeds, road environments, device states, and other information are exchanged in a bidirectional manner between vehicle nodes, and between the vehicle nodes and road-side nodes in a point-to-multipoint mode, or in a point-to-point mode through DSRC, so that the vehicles, and the vehicles and the road-side information acquiring devices are organically linked; and if a dangerous road condition occurring is perceived, then the vehicles will be alerted in a timely manner, so that a road accident can be avoided from occurring.

Services in the V2X system can be generally categorized into road safety, traffic efficiency, and information entertainment services, where the road safety services are the most predominant and also typical services in the V2X system. In an application scenario of the V2X system, communication is required with such a short delay and high reliability that a high capacity of the system is required; and all the vehicles at some distance need to communicate with each other, and there is a rapidly varying topology of the network.

At present, resources of DSRC communication in the V2X system are allocated in a timeslot resource allocation algorithm in which timeslots are reserved, where the basic idea of the timeslot resource allocation algorithm is that if a node device (e.g., an on-vehicle terminal) in the V2X system joins the network, then the node device will firstly monitor a frame of information for idle timeslot resources which currently can be perceived, and then select one of the idle timeslots as a timeslot to be occupied by the node device (i.e., an self-occupied timeslot), and if the node device does not monitor any negative feedback, then the node device will not abandon the timeslot occupied by the node device on its own initiative, that is, the node device can keep on transmitting data in the timeslot occupied by the node device, which is not accessible to any other node.

In summary, the existing timeslot resource allocation algorithm is totally performed by the node devices interacting with each other, thus resulting in a high probability that the node devices may collide with each other, which may degrade the security in the V2X system.

SUMMARY

Embodiments of the invention provide a method and apparatus for reporting information and allocating a resource in a V2X system so as to address the problem that the existing timeslot resource allocation algorithm is totally performed by the node devices interacting with each other, thus resulting in a high probability that the node devices may collide with each other, which may degrade the security in the V2X system.

An embodiment of the invention provides a method for allocating a resource in a V2X system, the method including:

allocating, by a network-side device, sub-frame resources for node devices initially accessing a cell, and notifying the initially allocated sub-frame resources to the node devices initially accessing the cell; and determining, by the network-side device, colliding node devices among the node devices which have accessed the cell, reallocating sub-frame resources for the colliding node devices, and notifying the reallocated sub-frame resources respectively to the colliding node devices Preferably determining, by the network-side device, the colliding node devices includes:

determining, by the network-side device, the colliding node devices according to interference information related to a sub-frame resource with interference reported by the node devices which have accessed the cell; and/or determining, by the network-side device, the colliding node devices according to current positional information, of the node devices which have accessed the cell, reported by the node devices.

Preferably determining, by the network-side device, the colliding node devices according to the interference information reported by the node devices in the cell includes:

determining, by the network-side device, the sub-frame resource with interference according to such information carried in the interference information that indicates a gap between the sub-frame resource with interference, and a sub-frame in which the interference information is transmitted; and determining, by the network-side device, such node devices in the cell that access the sub-frame resource with interference, according to the positional information of the node devices in the cell, and allocation information of the sub-frame resources of the node devices in the cell, and determining the determined node devices as the colliding node devices.

Preferably determining, by the network-side device, the colliding node devices according to the positional information reported by the node devices in the cell includes:

updating, by the network-side device, its stored distances between node devices multiplexing sub-frame resources, according to the positional information reported by the node devices in the cell, and the sub-frame resources allocated by the network-side device for the node devices in the cell; and determining, by the network-side device, node devices multiplexing any one of the sub-frame resources as the colliding node devices, upon determining that a distance between the node devices multiplexing the any one sub-frame resource is shorter than a preset shortest distance at which the sub-frame resource can be multiplexed.

Further to any one of the embodiments above, reallocating, by the network-side device, the sub-frame resources for the colliding node devices includes:

selecting, by the network-side device, one of the colliding node devices to further access a sub-frame resource with collision; and for the other colliding node devices than the selected node device, selecting, by the network-side device, sub-frame resources accessible to the other node devices from idle sub-frame resources, or sub-frame resources which have been multiplexed for the least numbers of times.

Further to any one of the embodiments above, allocating, by the network-side device, the sub-frame resources for the node devices initially accessing the cell includes:

allocating, by the network-side device, the sub-frame resources for the node devices initially accessing the cell from idle sub-frame resources; or selecting, by the network-side device, sub-frame resources accessed by the furthest node devices from the node devices initially accessing the cell, from sub-frame resources which can be multiplexed, according to positional information of the node devices initially accessing the cell.

Further to any one of the embodiments above, the method further includes:

updating, by the network-side device, occupancy state information of the sub-frame resources allocated for any one of the node devices in the cell, upon determining that the any one node device has left the cell, or has been powered off.

Preferably determining, by the network-side device, that the any one node device in the cell has left the cell, or has been powered off includes:

if the network-side device has not received any current positional information of the any one node device reported by the any one node device over a preset length of time, then determining, by the network-side device, that the any one node device in the cell has left the cell, or has been powered off; or determining, by the network-side device, whether the any one node device in the cell has left the cell, according to received positional information reported by the any one node device, and information about a coverage area of the cell.

Further to any one of the embodiments above, the positional information of the node device in the cell is information about a serial number corresponding to a region where the node device is located.

An embodiment of the invention provides a method for reporting information in a V2X system, the method including:

receiving, by a node device, sub-frame resources initially allocated by a network-side device for the node device while initially accessing a cell; and receiving, by the node device, sub-frame resources reallocated by the network-side device for the node device when the network-side device determines that the node device is colliding with another node device in the V2X system.

Preferably the Method Further Includes:

after the node device accesses the cell, reporting current positional information of the node device over a sub-frame resource allocated by the network-side device for the node device to report positional information, and monitoring other sub-frame resources than the sub-frame resources allocated by the network-side device for the node device; and reporting, by the node device, interference information related to a sub-frame resource with interference to the network-side device upon determining the monitored sub-frame resource with interference according to results of monitoring the other sub-frame resources.

Preferably the positional information is information about a serial number corresponding to a region where the node device is located.

Preferably determining, by the node device, the monitored sub-frame resource with interference according to the results of monitoring the other sub-frame resources includes:

if there is a result of monitoring indicating unsuccessful decoding, and that total received power is above a preset power threshold, then determining, by the node device, that there is a first category of interference occurring over the monitored sub-frame resource; or if there is a result of monitoring indicating successful decoding, and that the determined interference is above a preset threshold, then determining, by the node device, that there is a second category of interference occurring over the monitored sub-frame resource.

Preferably the interference information carries indication information indicating that the interference over the sub-frame resource with interference is the first category of interference or the second category of interference.

Preferably the interference information further includes information indicating a gap between the sub-frame resource with interference, and a sub-frame in which the interference information is transmitted.

An embodiment of the invention provides a base station including:

a processor configured to read programs in a memory, and to perform the processes of: allocating sub-frame resources for node devices initially accessing a cell, and notifying the initially allocated sub-frame resources to the node devices initially accessing the cell, through a transceiver; and determining colliding node devices among the node devices which have accessed the cell, reallocating sub-frame resources for the colliding node devices, and notifying the reallocated sub-frame resources respectively to the colliding node devices through the transceiver; and the transceiver is configured to be controlled by the processor to transmit and receive data.

Preferably the Processor is Configured:

to determine the colliding node devices according to interference information related to a sub-frame resource with interference reported by the node devices which have accessed the cell; and/or to determine the colliding node devices according to current positional information, of the node devices which have accessed the cell, reported by the node devices.

Preferably the processor configured to determine the colliding node devices according to the interference information reported by the node devices in the cell is configured:

to determine the sub-frame resource with interference according to such information carried in the interference information that indicates a gap between the sub-frame resource with interference, and a sub-frame in which the interference information is transmitted; and to determine such node devices in the cell that access the sub-frame resource with interference, according to the positional information of the node devices in the cell, and allocation information of the sub-frame resources of the node devices in the cell, and to determine the determined node devices as the colliding node devices.

Preferably the processor configured to determine the colliding node devices according to the positional information reported by the node devices in the cell is configured:

to update its stored distances between node devices multiplexing sub-frame resources, according to the positional information reported by the node devices in the cell, and the sub-frame resources allocated by the base station for the node devices in the cell; and to determine node devices multiplexing any one of the sub-frame resources as the colliding node devices, upon determining that a distance between the node devices multiplexing the any one sub-frame resource is shorter than a preset shortest distance at which the sub-frame resource can be multiplexed.

Further to any one of the embodiments above, the processor configured to reallocate the sub-frame resources for the colliding node devices is configured:

to select one of the colliding node devices to further access a sub-frame resource with collision; and for the other colliding node devices than the selected node device, to select sub-frame resources accessible to the other node devices from idle sub-frame resources, or sub-frame resources which have been multiplexed for the least numbers of times.

Further to any one of the embodiments above, the processor configured to allocate the sub-frame resources for the node devices initially accessing the cell is configured:

to allocate the sub-frame resources for the node devices initially accessing the cell from idle sub-frame resources; or to select sub-frame resources accessed by the furthest node devices from the node devices initially accessing the cell, from sub-frame resources which can be multiplexed, according to positional information of the node devices initially accessing the cell.

Further to any one of the embodiments above, the processor is further configured to update occupancy state information of the sub-frame resources allocated for any one of the node devices in the cell, upon determining that the any one node device has left the cell, or has been powered off.

Preferably the processor configured to determine that the any one node device has left the cell, or has been powered off is configured:

if the transceiver has not received any current positional information of the any one node device reported by the any one node device over a preset length of time, to determine that the any one node device in the cell has left the cell, or has been powered off; or to determine whether the any one node device in the cell has left the cell, according to positional information, reported by the any one node device, received by the transceiver, and information about a coverage area of the cell.

An embodiment of the invention provides a node device, including:

a processor configured to read programs in the memory, and to perform the processes of: receiving sub-frame resources initially allocated by a network-side device for the node device, through the transceiver, while the node device is initially accessing a cell; and receiving sub-frame resources reallocated by the network-side device for the node device through a transceiver when the network-side device determines that the node device is colliding with another node device in a V2X system; and the transceiver is configured to be controlled by the processor to receive and transmit data.

Preferably the processor is further configured: after the node device including the processor accesses the cell, to report current positional information of the node device through the transceiver over a sub-frame resource allocated by the network-side device for the node device to report positional information, and to monitor other sub-frame resources than the sub-frame resources allocated by the network-side device for the node device; and to report interference information related to a sub-frame resource with interference to the network-side device through the transceiver upon determining the monitored sub-frame resource with interference according to results of monitoring the other sub-frame resources.

Preferably the processor configured to determine the monitored sub-frame resource with interference according to the results of monitoring the other sub-frame resources is configured:

if there is a result of monitoring indicating unsuccessful decoding, and that total received power is above a preset power threshold, to determine that there is a first category of interference occurring over the monitored sub-frame resource; or if there is a result of monitoring indicating successful decoding, and that the determined interference is above a preset threshold, to determine that there is a second category of interference occurring over the monitored sub-frame resource.

The embodiments of the invention provide a method and apparatus for reporting information and allocating a resource in a V2X system, the network-side device schedules the resource centrally for the node devices accessing the cell, thus enabling the node device and the surrounding node device demanding for communication to multiplex the resources in a time-division mode so as to extend the capacity of the system, and also addressing the resource collision condition between the colliding node devices in a timely and working manner so as to improve the performance of communication between the node devices in the system.

DETAILED DESCRIPTION OF THE EMBODIMENTS

Figure 1:
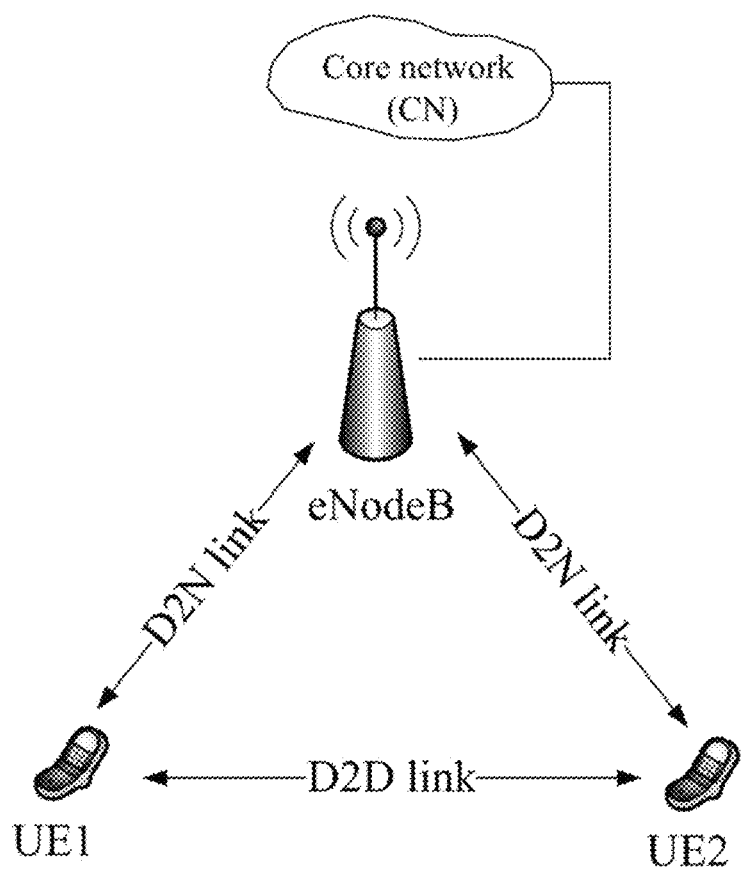
FIG. 1 is a schematic diagram of communication links in an LTE system.

In a Long Term Evolution (LTE) system, direct Device to Device (D2D) communication is allowed between devices proximate to each other. For the sake of a convenient description, a link of direction communication between D2D terminals will be referred to as a D2D link, and a link of cellular communication between a network and a D2D terminal will be referred to as a Device to Network (D2N) link, particularly as illustrated in FIG. 1. In the embodiments of the invention, the D2D framework and the D2N frame in the LTE system will be applicable to a V2X system, where a communication link between one node device and another is a D2D link, and a communication link between a node device and a network-side device (e.g., a base station) is a D2N link; and the network-side device schedules resources centrally for the node devices accessing a cell, thus enabling the node device to communicate with another surrounding node device demanding for communication, and also the node devices to multiplex D2D sub-frame resources in a time-division mode so as to extend the capability of the system.

The embodiments of the invention will be described below in further details with reference to the drawings. It shall be appreciated that the embodiments described here are merely intended to illustrate and describe the invention, but not to limit the invention.

Figure 2:
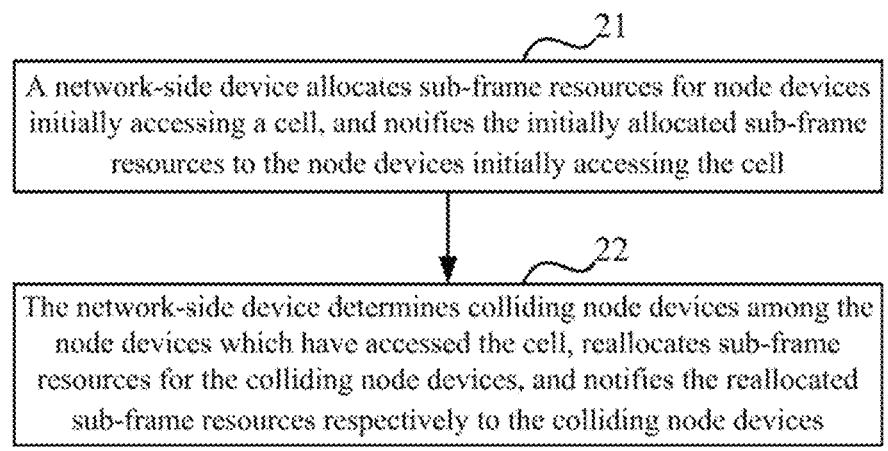
FIG. 2 is a schematic diagram of a method for allocating a resource in a V2X system according to an embodiment of the invention.

An embodiment of the invention provides a method for allocating a resource in a V2X system, and as illustrated in FIG. 2, the method includes:

In the operation 21, a network-side device allocates sub-frame resources for node devices initially accessing a cell, and notifies the initially allocated sub-frame resources to the node devices initially accessing the cell.

Particularly the node devices initially accessing the cell can send a sub-frame resource request to the network-side device to request the network-side device for allocating sub-frame resources for the node devices; the network-side device allocates the sub-frame resources for the node devices initially accessing the cell upon reception of the sub-frame resource request, and notifies the initially allocated sub-frame resources to the node devices initially accessing the cell; and the node devices keep on transmitting data over the sub-frame resources initially allocated by the network-side device for the node device in the area of the cell upon reception of these sub-frame resources.

In this operation, the sub-frame resources allocated by the network-side device for the node devices initially accessing the cell include but will not be limited to at least one of sub-frame resources over which current positional information of the node devices is to be reported, and sub-frame resources over which data are to be transmitted to other node devices.

In the operation 22, the network-side device determines colliding node devices among the node devices which have accessed the cell, reallocates sub-frame resources for the colliding node devices, and notifies the reallocated sub-frame resources respectively to the colliding node devices.

In the embodiment of the invention, such two processes are provided that the network-side device allocates the sub-frame resources for the node devices initially accessing the cell, and reallocates the sub-frame resources for the colliding node devices, so that the network-side device schedules the resource centrally for the node devices accessing the cell, thus enabling the node device and the surrounding node device demanding for communication to multiplex the resources in a time-division mode so as to extend the capacity of the system, and also addressing the resource collision condition between the colliding node devices in a timely and working manner so as to improve the performance of communication between the node devices in the system.

In an implementation, in the operation 21, the network-side device allocates the sub-frame resources for the node devices initially accessing the cell in the following two preferable schemes:

In a first scheme, the network-side device allocates the sub-frame resources for the node devices initially accessing the cell, from idle sub-frame resources.

In this scheme the network-side device selects the sub-frame resources for the node devices initially accessing the cell, from the currently idle sub-frame resources, and allocates those sub-frame resources for the node devices.

In a second scheme, the network-side device selects sub-frame resources accessed by the furthest node devices from the node devices initially accessing the cell, from sub-frame resources which can be multiplexed, according to positional information of the node devices initially accessing the cell.

In this scheme, the network-side device selects the sub-frame resources for the node devices initially accessing the cell, e.g., selects the sub-frame resources accessed by the furthest node devices from the node devices initially accessing the cell, from the sub-frame resources which can be multiplexed by the node devices initially accessing the cell, where a sub-frame resource which can be multiplexed by the node devices initially accessing the cell is a sub-frame resource satisfying such a multiplexing condition that the distance between node devices multiplexing a sub-frame resource is longer than a preset shortest distance at which the sub-frame resource can be multiplexed (i.e., a preset threshold).

The two schemes above can be applied separately or in combination, and particularly if there are idle sub-frame resources, then the network-side device will select the sub-frame resources for the node devices in the first scheme; and if there are no idle sub-frame resources, then the network-side device will select the sub-frame resources for the node devices in the second scheme.

In an implementation, in the operation 22, the network-side device determines the colliding node devices in the following two preferable schemes:

In a first scheme, the network-side device determines the colliding node devices according to interference information related to a sub-frame resource with interference reported by the node devices which have accessed the cell.

In this scheme, since the network-side device can not know by itself whether there are colliding node devices among the node devices which have accessed the cell, the network-side device needs to determine the colliding node devices based upon the interference information related to the sub-frame resource with interference reported by the node devices which have accessed the cell.

In this scheme, the interference information carries indication information indicating that interference over the sub-frame resource with interference is a first category of interference or a second category of interference.

Here the sub-frame resource with the first category of interference refers to a sub-frame resource for which there is unsuccessful decoding, and total received power is above a preset power threshold among sub-frame resources monitored by the node devices; and the sub-frame resource with the second category of interference refers to a sub-frame resource for which there is successful decoding, and the determined interference is above a preset threshold among the sub-frame resources monitored by the node device.

In this scheme, the network-side device determines the colliding node devices according to the interference information reported by the node devices in the cell as follows:

The network-side device determines the sub-frame resource with interference according to such information carried in the interference information that indicates the gap between the sub-frame resource with interference, and a sub-frame in which the interference information is transmitted; and The network-side device determines such node devices in the cell that access the sub-frame resource with interference, according to the positional information of the node devices in the cell, and allocation information of the sub-frame resources of the node devices in the cell, and determines the determined node devices as the colliding node devices.

Particularly the network-side device determines such node devices in the cell that access the sub-frame resource with interference, according to the sub-frame resources allocated by the network-side device for the node devices in the cell, and determines the colliding node devices according to the positional information of a node device reporting the interference, and the positional information of the respective node devices currently accessing the sub-frame resource with interference.

Particularly since the interference information can not be reported in real time, the interference information further carries the information indicating the gap between the sub-frame resource with interference, and the sub-frame in which the interference information is transmitted, e.g., System Frame Number (SFN) information, so that the network-side device can determine the position of the sub-frame resource with interference.

In an implementation, the network-side device may receive a plurality of pieces of interference information reported by one node over the same sub-frame resource, or may receive interference information reported concurrently by a plurality of node devices. The network-side device determines the sub-frame resource with interference according to the information indicating the gap carried in the respective pieces of interference information reported by the respective node devices. Preferably the interference information including the same interference information of a sub-frame resource with interference reported by the different node devices will not be processed repeatedly by the network-side device. After the sub-frame resource with interference is determined, the network-side device determines the colliding node devices according to locally buffered sub-frame resources occupancy information (i.e., allocation information of the sub-frame resources allocated by the network-side device for the respective nodes accessing the cell).

In a second scheme, the network-side device determines the colliding node devices according to current positional information, of the node devices which have accessed the cell, reported by the node devices.

In this scheme, since the network-side device can not know by itself whether there are colliding node devices among the node devices which have accessed the cell, the network-side device needs to determine the colliding node devices based upon the current positional information, of the node devices in the cell, reported by the node devices.

In this scheme, the network-side device determines the colliding node devices according to the positional information reported by the node devices in the cell as follows:

The network-side device updates its stored distances between node devices multiplexing sub-frame resources, according to the positional information reported by the node devices in the cell, and the sub-frame resources allocated by the network-side device for the node devices in the cell; and The network-side device determines node devices multiplexing any one of sub-frame resources as the colliding node devices, upon determining that the distance between the node devices multiplexing the any one sub-frame resource is shorter than a preset shortest distance at which the sub-frame resource can be multiplexed.

Particularly for the node devices multiplexing the sub-frame resource, the network-side device determines the distance between the node devices multiplexing the sub-frame resource, according to their reported positions. The network-side device determines whether there is a collision, according to the determined distance particularly as follows: the network-side device determines whether there is such a possibility that the two node devices collide, according to the preset shortest distance at which the sub-frame resource can be multiplexed. If it is determined that the distance between two node devices multiplexing some sub-frame resource is shorter than the shortest distance at which the sub-frame resource can be multiplexed, then it will be determined that it is possible for these two node devices to collide over the sub-frame resource.

Based on the first scheme and the second scheme, the network-side device can determine the colliding node devices according to the interference information reported by the node devices, but also can determine the colliding node devices according to the positional information reported by the node devices.

Further to any one of the embodiments above, in the operation 22, the network-side device reallocates the sub-frame resources for the colliding node devices as follows:

The network-side device selects one of the colliding node devices to further access the sub-frame resource with collision; and For the other colliding node devices than the selected node device, the network-side devices selects sub-frame resources accessible to the other node devices from the idle sub-frame resources, or sub-frame resources which have been multiplexed for the least numbers of times.

Particularly a sub-frame accessed by colliding node devices can only be further accessed by at most one of the node devices, and the sub-frame resources need to be adjusted for the other node devices. In order to lower an overhead of D2N link, one of the node devices can be selected randomly to further access the sub-frame resource. Of course, the network-side device can alternatively adjust the sub-frame resources for all the colliding node devices. The network-side device reselects the sub-frame resources for the colliding node devices under such a general principle that the idle sub-frame resources, or the sub-frame resources which have been multiplexed for the least numbers of times (while satisfying such a multiplexing condition that the distance between node devices multiplexing a sub-frame resource is longer than the preset shortest distance at which the sub-frame resource can be multiplexed) are selected for the colliding node devices according to the current positional information of the node devices to thereby equalize interference over the respective sub-frame resources.

In an implementation, in the first scheme above, since the interference information reported by the node devices carries the indication information indicating that the interference over the sub-frame resource with interference is the first category of interference or the second category of interference, the network-side device reallocates the sub-frame resources for the colliding node devices in the operation 22 preferably by firstly reallocating the sub-frame resources for the colliding node devices accessing the sub-frame resource with the first category of interference, and then reallocating the sub-frame resources for the colliding node devices accessing the sub-frame resource with the second category of interference.

In an implementation, the method further includes updating by the network-side device occupancy state information of the sub-frame resources allocated for any one of the node devices in the cell, upon determining that the any one node device has left the cell, or has been powered off.

Preferably the network-side device determines that the any one node device in the cell has left the cell, or has been powered off as follows:

If the network-side device has not received any current positional information of the any one node device reported by the any one node device over a preset length of time, then the network-side device will determine that the any one node device in the cell has left the cell, or has been powered off; or The network-side device determines whether the any one node device in the cell has left the cell, according to received positional information reported by the any one node device, and information about a coverage area of the cell.

Particularly if the network-side device has not received any interference information, related to the sub-frame resource with interference, reported by the any one node device, and has not received any current positional information of the any one node device reported by the any one node device, then the network-side device will determine that the any one node device in the cell has left the cell, or has been powered off.

Particularly the network-side device updates the occupancy state information of the sub-frame resources of the node device in the cell upon determining that the node device in the cell has left the cell, or has been powered off, according to a periodical underlying measurement quantity (e.g., obtained interference information) of the node device, and the positional information reported periodically by the node device. Particularly if the network-side device has not received any underlying measurement quantity or positional information reported by the node device over a period of time, then the network-side device will determine that the node device has left the cell, or has been powered off; or the network-side device can determine that the node device has left the cell, according to the positional information reported by the node device, and map information. The occupancy state information of the sub-frame resources of the node device can be updated by updating occupancy state information of a sub-frame resource to an idle state if the sub-frame resource is currently occupied only by the node device.

In an embodiment of the invention, the positional information reported by the node device is information about a serial number corresponding to a region where the node device is located.

Particularly a particular geographical position in an electronic map is mapped as a block region, and there is a preset corresponding relationship between the geographical position and the block region. The node device entering the cell downloads the map over a cellular network, and determines geographical positional regions corresponding to respective block regions. The node device moving to some particular position can know which block region the current geographical position belongs to. The node device can report the positional information periodically simply by reporting the serial number of the block region where it is located instead of the precise positional information.

In order to simplify the calculation of the distance between node devices, the distances between the different block regions are stored in advance. Once the serial numbers of the block regions where the two node devices are currently located are determined, the network-side device can determine the distance between the two node devices by looking up a table, that is, the network-side device can determine rough positions of the node devices upon reception of the serial numbers of the block regions, reported by the node devices.

It shall be noted that 1) the node device reports the positional information periodically without retransmitting it, and the network-side device makes no feedback for the reported information, but a locus predication model is preset in the network-side device, so that if the network-side device does not receive any positional information reported by the node device, then the network-side device will mark the node device with the possibility to leave the cell, but also the network-side device can predicate and update someway the movement locus of the node device using the predication model according to a historical locus of the node device, and the map information.

2) in an embodiment of the invention, the positional information is reported periodically, and the interference information is reported as triggered by an event, where the interference information is reported at a higher priority than the positional information, and the network-side device allocates such a special sub-frame resource for the node device that the positional information is reported over the sub-frame resource. If the node device has no interference information to be reported, then it will report the positional information periodically, and if the node device has interference information to be reported, then it will report the interference information over the closest sub-frame resource allocated for the node device to report positional information.

Further to any one of the embodiments above, in an implementation, in order to alleviate an influence upon an existing cellular service, a new control channel for communication over the V2X system is defined between the network-side device and the node device. Preferably in the operation 21, the network-side device notifies the initially allocated sub-frame resources to the node devices initially accessing the cell as follows: the network-side device notifies the initially allocated sub-frame resources to the node devices initially accessing the cell, over the dedicated control channel for communication over the V2X system.

Preferably in the operation 22, the network-side device notifies the reallocated sub-frame resources respectively to the colliding node devices as follows: the network-side device notifies the reallocated sub-frame resources respectively to the colliding node devices over the dedicated control channel for communication over the V2X system.

It shall be noted that if the newly defined control channel is a physical layer control channel, then retransmission will not be considered.

Figure 3:
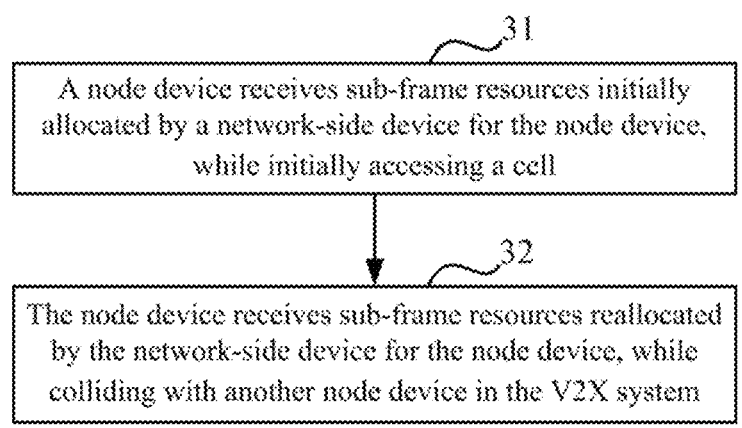
FIG. 3 is a schematic diagram of a method for reporting information in a V2X system according to an embodiment of the invention.

Based upon the same inventive idea, a method for reporting information in a V2X system according to an embodiment of the invention as illustrated in FIG. 3 includes:

In the operation 31, a node device receives sub-frame resources initially allocated by a network-side device for the node device, while initially accessing a cell; and In the operation 32, the node device receives sub-frame resources reallocated by the network-side device for the node device, while colliding with another node device in the V2X system.

In an implementation, the method further includes:

After the node device accesses the cell, the node device reports its current positional information over a sub-frame resource allocated by the network-side device for the node device to report positional information, and monitors other sub-frame resources than the sub-frame resources allocated by the network-side device for the node device; and The node device reports interference information related to a sub-frame resource with interference to the network-side device upon determining the monitored sub-frame resource with interference according to results of monitoring the other sub-frame resources.

In an implementation, the node device reports its current positional information periodically. Preferably the positional information reported by the node device is information about a serial number corresponding to a region (i.e., a block region) where the node device is located.

Further to any one of the embodiments above, the node device determines the monitored sub-frame resource with interference according to the results of monitoring the other sub-frame resources as follows:

If there is a result of monitoring indicating unsuccessful decoding, and that total received power is above a preset power threshold, then the node device will determine that there is a first category of interference (i.e., strong interference) occurring over the monitored sub-frame resource; or If there is a result of monitoring indicating successful decoding, and that the determined interference is above a preset threshold, then the node device will determine that there is a second category of interference (i.e., less strong interference) occurring over the monitored sub-frame resource.

Here the second category of interference needs to be determined by determining the interference over the monitored sub-frame resource, and since a Signal to Interference and Noise ratio (SINR) and the total received power over the sub-frame resource can be known, where the SINR is the ratio of a useful signal to interference, and the total received power is the sum of the useful signal and the interference, the interference over the sub-frame resource can be determined.

In an embodiment of the invention, the interference information reported by the node device carries indication information indicating that the interference over the sub-frame resource with interference is the first category of interference or the second category of interference. For example, the indication information is represented as one bit, where if the indication information is "O", then it will indicate that the first category of interference occurs over the sub-frame resource; and if the indication information is "1", then it will indicate that the second category of interference occurs over the sub-frame resource.

Preferably since the interference can not be reported in real time, the interference information reported by the node device further includes information indicating the gap between the sub-frame resource with interference, and a sub-frame in which the interference information is transmitted, e.g., SFN information, so that the network-side device can determine the position of the sub-frame with interference.

Further to any one of the embodiments above, the node device reports the interference information of the sub-frame resource with interference to the network-side device in the following two schemes:

In a first scheme, the node device reports the interference information of the sub-frame resource with interference to the network-side device over a sub-frame resource allocated by the network-side device for the node device to report positional information.

This scheme is particularly applicable to a scenario in which the sub-frame resource allocated by the network-side device for the node device to report positional information satisfies a preset required delay of interference information.

Preferably in this scheme, the node device reports the interference information of the sub-frame resource with interference to the network-side device over the closest sub-frame resource for reporting positional information to thereby enable the time-validity for reporting the interference information.

In a second scheme, the node device reports the interference information of the sub-frame resource with interference to the network-side device over a sub-frame resource allocated by the network-side device for the node device to report interference information.

This scheme is particularly applicable to a scenario in which the sub-frame resource allocated by the network-side device for the node device to report positional information does not satisfy a preset required delay of interference information.

In this scheme, after the node device determines the monitored sub-frame resource with interference, and before the node device reports the interference information of the sub-frame resource with interference to the network-side device over the sub-frame resource allocated by the network-side device for the node device to report interference information, the method further includes:

The node device sends a resource request to the network-side device to request the network-side device for allocating a sub-frame for the node device to report interference information to thereby enable the time-validity for reporting the interference information.

Preferably in this scheme, if the network-side device allocates a plurality of sub-frame resources for the node device to report interference information, then the node device will report the interference information of the sub-frame resource with interference to the network-side device over the closest sub-frame resource for reporting interference information to thereby enable the time-validity for reporting the interference information.

Further to any one of the embodiments above, in order to alleviate an influence upon an existing cellular service, a new control channel for communication over the V2X system is defined between the network-side device and the node device. Preferably in the operation 31, the node device receives the sub-frame resources initially allocated by the network-side device for the node device as follows: the node device receives the sub-frame resources initially allocated by the network-side device for the node device over the dedicated control channel for communication over the V2X system.

Preferably in the operation 32, the network-side device receives the sub-frame resources reallocated by the network-side device for the node device as follows: the network-side device receives the sub-frame resources reallocated by the network-side device for the node device, over the dedicated control channel for communication over the V2X system.

The methods according to the embodiments of the invention will be described below in details in connection with fourth particular embodiments thereof taking a base station as an example.

In a first embodiment, primarily processes of handling a collision, reporting strong interference by a node device (simply referred to as a node), and reallocating sub-frame resources by a base station will be described in this embodiment.

If a node A, a node B, and a node C belong to the same base station, the distance between the node A and the node C is one hop, and the distances between the node B and the node A, and between the node B and the node C are longer, then the base station will allocate sub-frame resources for these three nodes by allocating a sub-frame 1 for the node A and the node B (where the node A and the node B multiplex the sub-frame 1), and a sub-frame 2 for the node C, where the node B at the longer distances from both the node A and the node C, and the node B can multiplex the sub-frame 1 with the node A.

As the topology is varying, the distances between the node B and the node A, and between the node B and the node C become shorter, and since the node A and the node B access the same sub-frame resource, thus resulting in some interference to the node C, if the strength of a signal from the node B to the node C, is comparable to the strength of a signal from the node A to the node C, then the node C will determine that strong interference occurs in the sub-frame 1, and report it to the base station. If the strength of a signal from the node B to the node C is slightly stronger than the strength of a signal from the node A to the node C, then the node C will be capable of decoding the signal for information of the node B, but if there is high interference determined according to an SINR and total received power, then the node C will determine that less strong interference occurs in the sub-frame 1, and report it to the base station. The two categories of interference above can be reported by the node to the base station by distinguishing between the strong interference and the less strong interference, where the interference information reported by the node C carries the type of the interference (i.e., strong interference or less strong interference), and the sub-frame difference between the sub-frame with interference, and a sub-frame in which the interference information is reported.

The base station determines that the node A and the node B are colliding, according to the interference information, and current positional information and occupancy information of sub-frames of the respective nodes maintained by the base station, selects the node A to further access the existing sub-frame resource (i.e., the sub-frame 1), allocates a new sub-frame resource for the node B, and sends a resource reallocation indication via newly defined downlink control signaling.

In a second embodiment, primarily a resource adjusting process will be described in this embodiment.

If a node A and a node B are served by the same base station, and the base station allocates sub-frame resources for these two nodes, since there is a long distance between these two nodes, they can multiplex the same sub-frame. As the topology is varying, the distance between these two nodes becomes shorter, thus resulting in a possible demand for communication between them, but there is not any other node between these two nodes, so they can not perceive the presence of each other through any other node, and the node A and the node B can not receive any information of each other.

In this case, if the base station determines that the positions of these two nodes are such that their distance reaches the shortest distance at which a sub-frame resource can be multiplexed, according to information about sub-frame resources allocated by the base station for the nodes, and positional information reported by the nodes, then the base station will select the node A to further access the existing sub-frame source, allocate a new sub-frame resource for the node B, and send a resource reallocation indication via newly defined downlink control signaling.

In a third embodiment, primary an initial resource allocation process will be described in this embodiment.

A node A initially accesses a cell, and requests for a timeslot resource in a Random Access (RA) procedure, where the node A carries its positional information in the resource request.

A base station allocates a timeslot resource for the node A according to the positional information of the node A. The base station preferentially allocates a sub-frame resource which has not been allocated by the base station (i.e., an idle sub-frame resource), and if there is no idle sub-frame resource, then the base station will search for, and allocate for the node A, some sub-frame resource accessed by the furthest node from the node A among nodes occupying the sub-frame resource.

In a fourth embodiment, primarily a process of releasing a sub-frame resource will be described.

A base station allocates a sub-frame 1 for a node A, and the node A reports its positional information periodically to the base station over a D2N link, where the position is reported at a periodicity of X seconds.

The base station receives the positional information reported by the node A at an instance of time Y, but does not receive any positional information reported by the node at instances of time Y+X and Y+2X, and the base station determines that the node A may have been powered off, or is not in a coverage area of the base station. The base station can modify information about the sub-frame 1 directly by determining that an occupancy state of the sub-frame 1 is changed to an idle sub-frame; or the base station can start a timer M, and if the base station has not received any positional information or interference information reported by the node A before the timer M expires, then the base station will update the occupancy state of the sub-frame 1 to being idle.

The processing flows of the methods above can be performed in software programs which can be stored in a storage medium, and if the stored software programs are invoked, then the operations in the methods above will be performed.

Based upon the same inventive idea, an embodiment of the invention further provides an apparatus for allocating a resource in a V2X system, and since the apparatus addresses the problem under a similar principle to the method above for allocating a resource in a V2X system, reference can be made to the implementation of the method above for an implementation of the apparatus, so a repeated description thereof will be omitted here.

Figure 4:
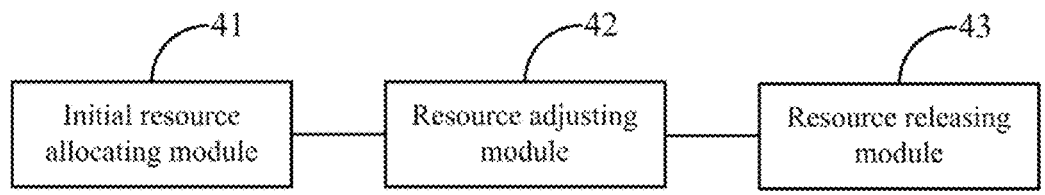
FIG. 4 is a schematic diagram of an apparatus for allocating a resource in a V2X system according to an embodiment of the invention.

As illustrated in FIG. 4, an apparatus for allocating a resource in a V2X system according to an embodiment of the invention includes:

An initial resource allocating module 41 configured to allocate sub-frame resources for node devices initially accessing a cell, and to notify the initially allocated sub-frame resources to the node devices initially accessing the cell; and A resource adjusting module 42 configured to determine colliding node devices among the node devices which have accessed the cell, to reallocate sub-frame resources for the colliding node devices, and to notify the reallocated sub-frame resources respectively to the colliding node devices.

In an implementation, the resource adjusting module 42 is configured:

To determine the colliding node devices according to interference information related to a sub-frame resource with interference reported by the node devices which have accessed the cell; and/or To determine the colliding node devices according to current positional information, of the node devices which have accessed the cell, reported by the node devices.

In an implementation, the resource adjusting module 42 configured to determine the colliding node devices according to the interference information reported by the node devices in the cell is configured:

To determine the sub-frame resource with interference according to such information carried in the interference information that indicates the gap between the sub-frame resource with interference, and a sub-frame in which the interference information is transmitted; and To determine such node devices in the cell that access the sub-frame resource with interference, according to the positional information of the node devices in the cell, and allocation information of the sub-frame resources of the node devices in the cell, and to determine the determined node devices as the colliding node devices.

In an embodiment of the invention, the interference information reported by the node device carries indication information indicating that the interference over the sub-frame resource with interference is a first category of interference or a second category of interference.

Here the sub-frame resource with the first category of interference refers to a sub-frame resource for which there is unsuccessful decoding, and total received power is above a preset power threshold among sub-frame resources monitored by a node devices; and the sub-frame resource with the second category of interference refers to a sub-frame resource for which there is successful decoding, and the determined interference is above a preset threshold among the sub-frame resources monitored by the node device.

Preferably since the interference information can not be reported in real time, the interference information reported by the node devices further carries the information indicating the gap between the sub-frame resource with interference, and the sub-frame in which the interference information is transmitted.

In an implementation, the resource adjusting module 42 configured to determine the colliding node devices according to the positional information reported by the node devices in the cell is configured:

To update its stored distances between node devices multiplexing sub-frame resources, according to the positional information reported by the node devices in the cell, and the sub-frame resources allocated by the initial resource allocating module 41 or the apparatus for the node devices in the cell; and To determine node devices multiplexing any one of sub-frame resources as the colliding node devices, upon determining that the distance between the node devices multiplexing the any one sub-frame resource is shorter than a preset shortest distance at which the sub-frame resource can be multiplexed.

Preferably the positional information reported by the node devices is information about serial numbers corresponding to region where the node devices are located.

Further to any one of the embodiments above, the resource adjusting module 42 configured to reallocate the sub-frame resources for the colliding node devices is configured:

To select one of the colliding node devices to further access the sub-frame resource with collision; and For the other colliding node devices than the selected node device, to select sub-frame resources accessible to the other node devices from idle sub-frame resources, or sub-frame resources which have been multiplexed for the least numbers of times.

In an implementation, the initial resource allocating module 41 is configured:

To allocate the sub-frame resources for the node devices initially accessing the cell from idle sub-frame resources; or To select sub-frame resources accessed by the furthest node devices from the node devices initially accessing the cell, from sub-frame resources which can be multiplexed, according to positional information of the node devices initially accessing the cell.

In an implementation, the apparatus further includes:

A resource releasing module 43 configured to update occupancy state information of the sub-frame resources allocated for any one of the node devices in the cell, upon determining that the any one node device has left the cell, or has been powered off.

Preferably the resource releasing module 43 is configured:

If there is not any received current positional information of the any one node device reported by the any one node device over a preset length of time, to determine that the any one node device in the cell has left the cell, or has been powered off, or To determine whether the any one node device in the cell has left the cell, according to received positional information reported by the any one node device, and information about a coverage area of the cell.

Preferably the resource releasing module 43 is configured:

If there is not any received interference information, related to the sub-frame resource with interference, reported by the any one node device, and there is not any received current positional information of the any one node device reported by the any one node device, to determine that the any one node device in the cell has left the cell, or has been powered off.

In order to alleviate an influence upon an existing cellular service, a new control channel for communication over the V2X system is defined between the network-side device and the node device. Preferably the initial resource allocating module 41 is configured to notify the initially allocated sub-frame resources to the node devices initially accessing the cell, over the dedicated control channel for communication over the V2X system.

Preferably the resource adjusting module 42 is configured to notify the reallocated sub-frame resources to the colliding node devices over the dedicated control channel for communication over the V2X system.

Based upon the same inventive idea, an embodiment of the invention further provides node device for reporting information in a V2X system, and since the node device addresses the problem under a similar principle to the method above for reporting Information in a V2X system, reference can be made to the implementation of the method above for an implementation of the node device, so a repeated description thereof will be omitted here.

Figure 5:
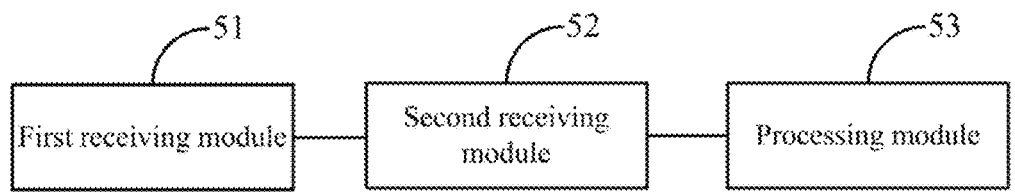
FIG. 5 is a schematic diagram of an apparatus for reporting information in a V2X system according to an embodiment of the invention.

As illustrated in FIG. 5, a node device for reporting information in a V2X system according to an embodiment of the invention comprises:

A first receiving module 51 configured to receive sub-frame resources initially allocated by a network-side device for the node device including the first receiving module, while the apparatus is initially accessing a cell; and A second receiving module 52 configured to receive sub-frame resources reallocated by the network-side device for the node device when the network-side device determines that the node device is colliding with another node device in the V2X system.

In an implementation, the node device further includes:

A processing module 53 configured, after the node device including the processing module accesses the cell, to report current positional information of the node device over a sub-frame resource allocated by the network-side device for the node device to report positional information, and to monitor other sub-frame resources than the sub-frame resources allocated by the network-side device for the node device; and to report interference information related to a sub-frame resource with interference to the network-side device upon determining the monitored sub-frame resource with interference according to results of monitoring the other sub-frame resources.

In an implementation, the processing module 53 configured to determine the monitored sub-frame resource with interference according to the results of monitoring the other sub-frame resources is configured:

If there is a result of monitoring indicating unsuccessful decoding, and that total received power is above a preset power threshold, to determine that there is a first category of interference occurring over the monitored sub-frame resource; or if there is a result of monitoring indicating successful decoding, and that the determined interference is above a preset threshold, to determine that there is a second category of interference occurring over the monitored sub-frame resource.

In an embodiment of the invention, the interference information carries indication information indicating that the interference over the sub-frame resource with interference is the first category of interference or the second category of interference.

Preferably since the interference can not be reported in real time, the interference information further includes information indicating the gap between the sub-frame resource with interference, and a sub-frame in which the interference information is transmitted, e.g., SFN information, so that the network-side device can determine the position of the sub-frame with interference.

In an implementation, the processing module 53 configured to report the interference information of the sub-frame resource with interference to the network-side device is configured:

To report the interference information of the sub-frame resource with interference to the network-side device over a sub-frame resource allocated by the network-side device for the node device to report positional information, or To report the interference information of the sub-frame resource with interference to the network-side device over a sub-frame resource allocated by the network-side device for the node device to report interference information.

Preferably the processing module 53 is further configured, after the monitored sub-frame resource with interference is determined, and before the interference information of the sub-frame resource with interference is reported to the network-side device over the sub-frame resource allocated by the network-side device for the node device to report interference information:

To send a resource request to the network-side device to request the network-side device for allocating a sub-frame for the node device to report interference information.

In an implementation, a new control channel for communication over the V2X system is defined between the network-side device and the node device. Preferably the first receiving module 51 is configured to receive the sub-frame resources initially allocated by the network-side device for the node device including the first receiving module over the dedicated control channel for communication over the V2X system.

Preferably the second receiving module 52 is configured to receive the sub-frame resources reallocated by the network-side device for the node device, over the dedicated control channel for communication over the V2X system.

The structure of and processing by a network-side device according to an embodiment of the invention will be described below in connection with a preferable hardware structure thereof.

Figure 6:
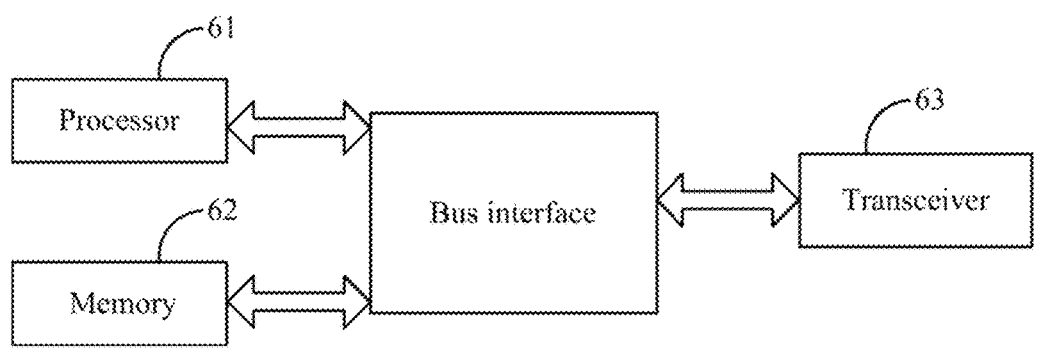
FIG. 6 is a schematic diagram of a base station according to an embodiment of the invention.

As illustrated in FIG. 6, a base station according to an embodiment of the invention includes:

A processor 61 configured to read programs in a memory 62, and to perform the processes of: allocating sub-frame resources for node devices initially accessing a cell, and notifying the initially allocated sub-frame resources to the node devices initially accessing the cell, through a transceiver 63; and determining colliding node devices among the node devices which have accessed the cell, reallocating sub-frame resources for the colliding node devices, and notifying the reallocated sub-frame resources respectively to the colliding node devices through the transceiver 63; and The transceiver 63 configured to be controlled by the processor 61 to transmit and receive data.

Here in FIG. 6, the bus architecture can include any number of interconnected buses and bridges, particularly various circuits of one or more processors represented by the processor 61, and one or more memories represented by the memory 62 are linked together. The bus architecture can further link together various other circuits, e.g., peripheral devices, a voltage stabilizer, a power management circuit, etc., which are well known in the art, so a further description thereof will be omitted in this context. The bus interface provides an interface. The transceiver 63 can include a number of elements, e.g., a transmitter and a receiver, configured to provide units for communication with various other devices over a transmission medium. The processor 61 is responsible for managing the bus architecture and typical processes, and the memory 62 can store data to be used by the processor 61 in operation.

In an implementation, the processor 61 is configured:

To determine the colliding node devices according to interference information related to a sub-frame resource with interference reported by the node devices which have accessed the cell; and/or To determine the colliding node devices according to current positional information, of the node devices which have accessed the cell, reported by the node devices.

In an embodiment of the invention, the interference information reported by the node device carries indication information indicating that the interference over the sub-frame resource with interference is a first category of interference or a second category of interference.

Here the sub-frame resource with the first category of interference refers to a sub-frame resource for which there is unsuccessful decoding, and total received power is above a preset power threshold among sub-frame resources monitored by a node devices; and the sub-frame resource with the second category of interference refers to a sub-frame resource for which there is successful decoding, and the determined interference is above a preset threshold among the sub-frame resources monitored by the node device.

Preferably since the interference information can not be reported in real time, the interference information reported by the node devices further carries the information indicating the gap between the sub-frame resource with interference, and the sub-frame in which the interference information is transmitted.

In an implementation, the processor 61 configured to determine the colliding node devices according to the interference information reported by the node devices in the cell is configured:

To determine the sub-frame resource with interference according to such information carried in the interference information that indicates the gap between the sub-frame resource with interference, and a sub-frame in which the interference information is transmitted; and To determine such node devices in the cell that access the sub-frame resource with interference, according to the positional information of the node devices in the cell, and allocation information of the sub-frame resources of the node devices in the cell, and to determine the determined node devices as the colliding node devices.

In an implementation, the processor 61 configured to determine the colliding node devices according to the positional information reported by the node devices in the cell is configured:

To update its stored distances between node devices multiplexing sub-frame resources, according to the positional information reported by the node devices in the cell, and the sub-frame resources allocated by the base station for the node devices in the cell; and To determine node devices multiplexing any one of sub-frame resources as the colliding node devices, upon determining that the distance between the node devices multiplexing the any one sub-frame resource is shorter than a preset shortest distance at which the sub-frame resource can be multiplexed.

Preferably the positional information reported by the node devices is information about serial numbers corresponding to region where the node devices are located.

Further to any one of the embodiments above, the processor 61 configured to reallocate the sub-frame resources for the colliding node devices is configured:

To select one of the colliding node devices to further access the sub-frame resource with collision; and For the other colliding node devices than the selected node device, to select sub-frame resources accessible to the other node devices from idle sub-frame resources, or sub-frame resources which have been multiplexed for the least numbers of times.

In an implementation, the processor 61 configured to allocate the sub-frame resources for the node devices initially accessing the cell is configured:

To allocate the sub-frame resources for the node devices initially accessing the cell from idle sub-frame resources; or to select sub-frame resources accessed by the furthest node devices from the node devices initially accessing the cell, from sub-frame resources which can be multiplexed, according to positional information of the node devices initially accessing the cell.

In an implementation, the processor 61 is further configured to update occupancy state information of the sub-frame resources allocated for any one of the node devices in the cell, upon determining that the any one node device has left the cell, or has been powered off.

Preferably the processor 61 configured to determine that the any one node device in the cell has left the cell, or has been powered off is configured:

If the transceiver 63 has not received any current positional information of the any one node device reported by the any one node device over a preset length of time, to determine that the any one node device in the cell has left the cell, or has been powered off; or To determine whether the any one node device in the cell has left the cell, according to positional information, reported by the any one node device, received by the transceiver 63, and information about a coverage area of the cell.

Preferably the processor 61 is configured, if the transceiver 63 has not received any interference information, related to the sub-frame resource with interference, reported by the any one node device, and there is not any received current positional information of the any one node device reported by the any one node device, to determine that the any one node device in the cell has left the cell, or has been powered off.

In order to alleviate an influence upon an existing cellular service, a new control channel for communication over the V2X system is defined between the network-side device and the node device. Preferably the transceiver 63 is configured:

To notify the initially allocated sub-frame resources to the node devices initially accessing the cell, over the dedicated control channel for communication over the V2X system.

Preferably the transceiver 63 is configured to notify the reallocated sub-frame resources to the colliding node devices over the dedicated control channel for communication over the V2X system.

The structure of and processing by a base station according to an embodiment of the invention will be described below in connection with a preferable hardware structure thereof.

Figure 7:
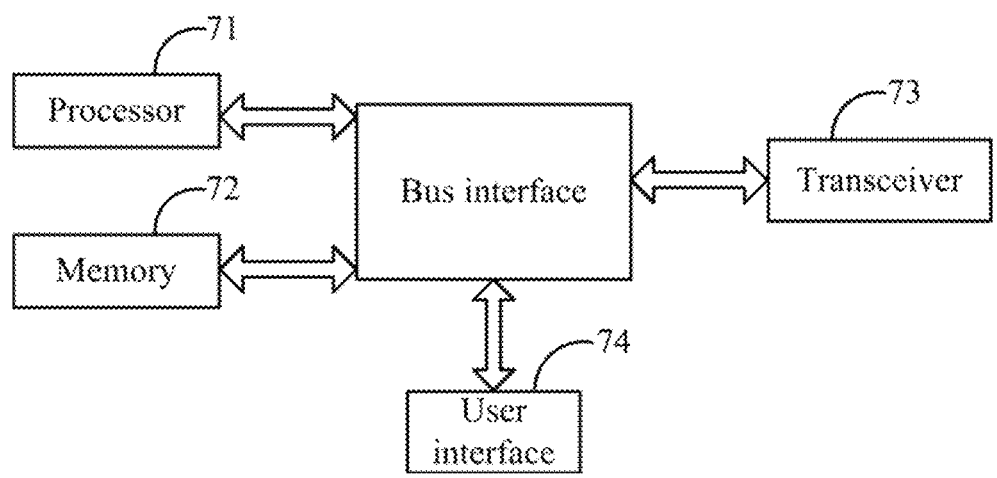
FIG. 7 is a schematic diagram of a node device according to an embodiment of the invention.

As illustrated in FIG. 7, a node device according to an embodiment of the invention includes:

A processor 71 configured to read programs in a memory 72, and to perform the processes of: receiving sub-frame resources initially allocated by a network-side device for the node device including the processor, through a transceiver 73, while the node device is initially accessing a cell; and receiving sub-frame resources reallocated by the network-side device for the node device through a transceiver 73 when the network-side device determines that the node device is colliding with another node device in a V2X system; and The transceiver 73 configured to be controlled by the processor 71 to receive and transmit data.

Here in FIG. 7, the bus architecture can include any number of interconnected buses and bridges, particularly various circuits of one or more processors represented by the processor 71, and one or more memories represented by the memory 72 are linked together. The bus architecture can further link together various other circuits, e.g., peripheral devices, a voltage stabilizer, a power management circuit, etc., which are well known in the art, so a further description thereof will be omitted in this context. The bus interface provides an interface. The transceiver 73 can include a number of elements, e.g., a transmitter and a receiver, configured to provide units for communication with various other devices over a transmission medium. For different user equipments, the user interface 74 can also be an interface via which external or internal devices are connected as appropriate, where the connected devices include but will not be limited to a keypad, a display, a speaker, a microphone, a joystick, etc.

The processor 71 is responsible for managing the bus architecture and typical processes, and the memory 72 can store data to be used by the processor 71 in operation.

In an implementation, the processor 71 is further configured: after the node device including the processor accesses the cell, to report current positional information of the node device through the transceiver 73 over a sub-frame resource allocated by the network-side device for the node device to report positional information, and to monitor other sub-frame resources than the sub-frame resources allocated by the network-side device for the node device; and to report interference information related to a sub-frame resource with interference to the network-side device through the transceiver 73 upon determining the monitored sub-frame resource with interference according to results of monitoring the other sub-frame resources.

In an implementation, the processor 71 configured to determine the monitored sub-frame resource with interference according to the results of monitoring the other sub-frame resources is configured:

If there is a result of monitoring indicating unsuccessful decoding, and that total received power is above a preset power threshold, to determine that there is a first category of interference occurring over the monitored sub-frame resource; or if there is a result of monitoring indicating successful decoding, and that the determined interference is above a preset threshold, to determine that there is a second category of interference occurring over the monitored sub-frame resource.

In an embodiment of the invention, the interference information carries indication information indicating that the interference over the sub-frame resource with interference is the first category of interference or the second category of interference.

Preferably since the interference can not be reported in real time, the interference information further includes information indicating the gap between the sub-frame resource with interference, and a sub-frame in which the interference information is transmitted, e.g., SFN information, so that the network-side device can determine the position of the sub-frame with interference.

In an implementation, the transceiver 73 configured to report the interference information of the sub-frame resource with interference to the network-side device is configured:

To report the interference information of the sub-frame resource with interference to the network-side device over a sub-frame resource allocated by the network-side device for the node device to report positional information; or To report the interference information of the sub-frame resource with interference to the network-side device over a sub-frame resource allocated by the network-side device for the node device to report interference information.

Preferably the processor 71 is further configured, after the monitored sub-frame resource with interference is determined, and before the interference information of the sub-frame resource with interference is reported to the network-side device through the transceiver 73 over the sub-frame resource allocated by the network-side device for the node device to report interference information:

To send a resource request to the network-side device through the transceiver 73 to request the network-side device for allocating a sub-frame for the node device to report interference information.

In an implementation, a new control channel for communication over the V2X system is defined between the network-side device and the node device. Preferably the transceiver 73 is configured to receive the sub-frame resources initially allocated by the network-side device for the node device including the transceiver over the dedicated control channel for communication over the V2X system.

Preferably the transceiver 73 is configured to receive the sub-frame resources reallocated by the network-side device for the node device, over the dedicated control channel for communication over the V2X system.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for allocating a resource in a V2X system, the method comprising:
    allocating, by a network-side device, sub-frame resources for node devices initially accessing a cell, and notifying the initially allocated sub-frame resources to the node devices initially accessing the cell; and determining, by the network-side device, colliding node devices among the node devices which have accessed the cell, reallocating sub-frame resources for the colliding node devices, and notifying the reallocated sub-frame resources respectively to the colliding node devices;

wherein determining, by the network-side device, the colliding node devices comprises:

determining, by the network-side device, the colliding node devices according to interference information related to a sub-frame resource with interference reported by the node devices which have accessed the cell; and/or determining, by the network-side device, the colliding node devices according to current positional information, of the node devices which have accessed the cell, reported by the node devices;

wherein determining, by the network-side device, the colliding node devices according to the interference information reported by the node devices in the cell comprises:

determining, by the network-side device, the sub-frame resource with interference according to such information carried in the interference information that indicates a gap between the sub-frame resource with interference and a sub-frame in which the interference information is transmitted; and determining, by the network-side device, such node devices in the cell that access the sub-frame resource with interference, according to the positional information of the node devices in the cell, and allocation information of the sub-frame resources of the node devices in the cell, and determining the determined node devices as the colliding node devices; and the determining, by the network-side device, the colliding node devices according to the positional information reported by the node devices in the cell comprises:

updating by the network-side device, its stored distances between node devices multiplexing sub-frame resources, according to the positional information reported by the node devices in the cell, and the sub-frame resources allocated by the network-side device for the node devices in the cell; and determining, by the network-side device, node devices multiplexing any one of sub-frame resources as the colliding node devices, upon determining that a distance between the node devices multiplexing the any one of sub-frame resources is shorter than a preset shortest distance at which the any one of sub-frame resources is multiplexed.

2. The method according to claim 1, wherein reallocating, by the network-side device, the sub-frame resources for the colliding node devices comprises:

selecting, by the network-side device, one of the colliding node devices to further access a sub-frame resource with collision; and for the other colliding node devices than the selected node device, selecting, by the network-side device, sub-frame resources accessible to the other node devices from idle sub-frame resources, or sub-frame resources which have been multiplexed for the least numbers of times.

3. The method according to claim 1, wherein allocating, by the network-side device, the sub-frame resources for the node devices initially accessing the cell comprises:

allocating, by the network-side device, the sub-frame resources for the node devices initially accessing the cell from idle sub-frame resources; or selecting, by the network-side device, sub-frame resources accessed by the furthest node devices from the node devices initially accessing the cell, from sub-frame resources which can be multiplexed, according to positional information of the node devices initially accessing the cell.

4. The method according to claim 1, wherein the method further comprises:

updating, by the network-side device, occupancy state information of the sub-frame resources allocated for any one of the node devices in the cell, upon determining that the any one node device has left the cell, or has been powered off;

wherein determining, by the network-side device, that the any one node device in the cell has left the cell, or has been powered off comprises:

when the network-side device has not received any current positional information of the any one node device reported by the any one node device over a preset length of time, then determining, by the network-side device, that the any one node device in the cell has left the cell, or has been powered off; or determining, by the network-side device, whether the any one node device in the cell has left the cell, according to received positional information reported by the any one node device, and information about a coverage area of the cell.

5. A method for reporting information in a V2X system, the method comprising:

receiving, by a node device, sub-frame resources initially allocated by a network-side device for the node device while initially accessing a cell; and receiving, by the node device, sub-frame resources reallocated by the network-side device for the node device when the network-side device determines that the node device is colliding with another node device in the V2X system;

wherein the network-side device determines that the node device is colliding with another node device in the V2X system comprises:

determining, by the network-side device, that the node device is colliding with another node device in the V2X system according to interference information related to a sub-frame resource with interference reported by the node device; and/or determining, by the network-side device, that the node device is colliding with another node device in the V2X system according to current positional information of the node device reported by the node device;

wherein the determining, by the network-side device, that the node device is colliding with the another node device in the V2X system according to the interference information related to the sub-frame resource with interference reported by the node device comprises:

determining, by the network-side device, the sub-frame resource with interference according to such information carried in the interference information that indicates a gap between the sub-frame resource with interference and a sub-frame in which the interference information is transmitted; and determining, by the network-side device, the node device in the cell that access the sub-frame resource with interference is colliding with the another node device in the V2X system, according to positional information of the node device in the cell, and allocation information of the sub-frame resources of the node device in the cell; and the determining, by the network-side device, that the node device is colliding with the another node device in the V2X system according to the current positional information of the node device reported by the node device comprises:

updating, by the network-side device, its stored distances between node devices multiplexing sub-frame resources, according to the positional information reported by the node device in the cell, and the sub-frame resources allocated by the network-side device for the node device in the cell; and determining, by the network-side device, the node device is colliding with the another node device in the V2X system, upon determining that a distance between the node device and the another node device in the V2X system which are multiplexing any one of sub-frame resources is shorter than a preset shortest distance at which the any one of sub-frame resources is multiplexed.

6. The method according to claim 5, wherein the method further comprises:

after the node device accesses the cell, reporting current positional information of the node device over a sub-frame resource allocated by the network-side device for the node device to report positional information, and monitoring other sub-frame resources than the sub-frame resources allocated by the network-side device for the node device; and reporting, by the node device, interference information related to a sub-frame resource with interference to the network-side device upon determining the monitored sub-frame resource with interference according to results of monitoring the other sub-frame resources.

7. The method according to claim 6, wherein determining, by the node device, the monitored sub-frame resource with interference according to the results of monitoring the other sub-frame resources comprises:

when there is a result of monitoring indicating unsuccessful decoding, and that total received power is above a preset power threshold, then determining, by the node device, that there is a first category of interference occurring over the monitored sub-frame resource; or when there is a result of monitoring indicating successful decoding, and that the determined interference is above a preset threshold, then determining, by the node device, that there is a second category of interference occurring over the monitored sub-frame resource.

8. The method according to claim 7, wherein the interference information carries indication information indicating that the interference over the sub-frame resource with interference is the first category of interference or the second category of interference;

wherein the interference information further comprises information indicating a gap between the sub-frame resource with interference, and a sub-frame in which the interference information is transmitted.

9. A base station, comprising a processor, a memory, and a transceiver, wherein:

the processor is configured to read programs in the memory, and to perform the processes of: allocating sub-frame resources for node devices initially accessing a cell, and notifying the initially allocated sub-frame resources to the node devices initially accessing the cell, through the transceiver; and determining colliding node devices among the node devices which have accessed the cell, reallocating sub-frame resources for the colliding node devices, and notifying the reallocated sub-frame resources respectively to the colliding node devices through the transceiver; and the transceiver is configured to be controlled by the processor to transmit and receive data;

wherein the processor is further configured to:

determine the colliding node devices according to interference information related to a sub-frame resource with interference reported by the node devices which have accessed the cell; and/or determine the colliding node devices according to current positional information, of the node devices which have accessed the cell, reported by the node devices;

determine the sub-frame resource with interference according to such information carried in the interference information that indicates a gap between the sub-frame resource with interference and a sub-frame in which the interference information is transmitted;

determine such node devices in the cell that access the sub-frame resource with interference, according to the positional information of the node devices in the cell, and allocation information of the sub-frame resources of the node devices in the cell, and determining the determined node devices as the colliding node devices;

update its stored distances between node devices multiplexing sub-frame resources, according to the positional information reported by the node devices in the cell, and the sub-frame resources allocated by the network-side device for the node devices in the cell; and determine node devices multiplexing any one of sub-frame resources as the colliding node devices, upon determining that a distance between the node devices multiplexing the any one of sub-frame resources is shorter than a preset shortest distance at which the any one of sub-frame resources is multiplexed.

10. The base station according to claim 9, wherein the processor is configured:

to select one of the colliding node devices to further access a sub-frame resource with collision; and for the other colliding node devices than the selected node device, to select sub-frame resources accessible to the other node devices from idle sub-frame resources, or sub-frame resources which have been multiplexed for the least numbers of times.

11. The base station according to claim 10, wherein the processor is configured:

to allocate the sub-frame resources for the node devices initially accessing the cell from idle sub-frame resources; or to select sub-frame resources accessed by the furthest node devices from the node devices initially accessing the cell, from sub-frame resources which can be multiplexed, according to positional information of the node devices initially accessing the cell.

12. The base station according to claim 10, wherein the processor is further configured:

to update occupancy state information of the sub-frame resources allocated for any one of the node devices in the cell, upon determining that the any one node device has left the cell, or has been powered off; and the processor is configured:

when the transceiver has not received any current positional information of the any one node device reported by the any one node device over a preset length of time, to determine that the any one node device in the cell has left the cell, or has been powered off; or to determine whether the any one node device in the cell has left the cell, according to positional information, reported by the any one node device, received by the transceiver, and information about a coverage area of the cell.

13. A node device, comprising a processor, a memory, and a transceiver, wherein:

the processor is configured to read programs in the memory, and to perform the processes of: receiving sub-frame resources initially allocated by a network-side device for the node device, through the transceiver, while the node device is initially accessing a cell; and receiving sub-frame resources reallocated by the network-side device for the node device through the transceiver when the network-side device determines that the node device is colliding with another node device in a V2X system; and the transceiver is configured to be controlled by the processor to receive and transmit data;

wherein the network-side device determines that the node device is colliding with another node device in the V2X system comprises:

determining, by the network-side device, that the node device is colliding with another node device in the V2X system according to interference information related to a sub-frame resource with interference reported by the node device; and/or determining, by the network-side device, that the node device is colliding with another node device in the V2X system according to current positional information of the node device reported by the node device;

wherein the determining, by the network-side device, that the node device is colliding with the another node device in the V2X system according to the interference information related to the sub-frame resource with interference reported by the node device;

determining, by the network-side device, the sub-frame resource with interference according to such information carried in the interference information that indicates a gap between the sub-frame resource with interference and a sub-frame in which the interference information is transmitted; and determining, by the network-side device, the node device in the cell that access the sub-frame resource with interference is colliding with the another node device in the V2X system, according to positional information of the node device in the cell, and allocation information of the sub-frame resources of the node device in the cell; and the determining, by the network-side device, that the node device is colliding with the another node device in the V2X system according to the current positional information of the node device reported by the node device;

updating by the network-side device, its stored distances between node devices multiplexing sub-frame resources, according to the positional information reported by the node device in the cell, and the sub-frame resources allocated by the network-side device for the node device in the cell; and determining, by the network-side device, the node device is colliding with the another node device in the V2X system, upon determining that a distance between the node device and the another node device in the V2X system which are multiplexing any one of sub-frame resources is shorter than a preset shortest distance at which the any one of sub-frame resources is multiplexed.

14. The node device according to claim 13, wherein the processor is further configured:

after the node device comprising the processor accesses the cell, to report current positional information of the node device through the transceiver over a sub-frame resource allocated by the network-side device for the node device to report positional information, and to monitor other sub-frame resources than the sub-frame resources allocated by the network-side device for the node device; and to report interference information related to a sub-frame resource with interference to the network-side device through the transceiver upon determining the monitored sub-frame resource with interference according to results of monitoring the other sub-frame resources.

15. The node device according to claim 14, wherein the processor is configured:

when there is a result of monitoring indicating unsuccessful decoding, and that total received power is above a preset power threshold, to determine that there is a first category of interference occurring over the monitored sub-frame resource; or if there is a result of monitoring indicating successful decoding, and that the determined interference is above a preset threshold, to determine that there is a second category of interference occurring over the monitored sub-frame resource.

* * * * *